United States Patent
Nilsson

(10) Patent No.: US 11,963,014 B2
(45) Date of Patent: Apr. 16, 2024

(54) METHOD IN A NETWORK ENTITY FOR ESTABLISHING NETWORK CELLS AND NETWORK ENTITY CONFIGURED FOR PERFORMING SUCH METHOD

(71) Applicant: Telefonaktiebolaget LM Ericsson (publ), Stockholm (SE)

(72) Inventor: Jimmy Nilsson, Varberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 383 days.

(21) Appl. No.: 17/614,522

(22) PCT Filed: May 27, 2019

(86) PCT No.: PCT/SE2019/050489
§ 371 (c)(1),
(2) Date: Nov. 27, 2021

(87) PCT Pub. No.: WO2020/242353
PCT Pub. Date: Dec. 3, 2020

(65) Prior Publication Data
US 2022/0232395 A1 Jul. 21, 2022

(51) Int. Cl.
*H04W 16/24* (2009.01)
*H04L 5/00* (2006.01)
*H04W 76/10* (2018.01)

(52) U.S. Cl.
CPC ............ *H04W 16/24* (2013.01); *H04L 5/005* (2013.01); *H04W 76/10* (2018.02)

(58) Field of Classification Search
CPC ..... H04W 16/24; H04W 76/10; H04W 16/02; H04W 16/08; H04W 48/12; H04W 16/18; H04W 24/02; H04L 5/005
See application file for complete search history.

(56) References Cited

U.S. PATENT DOCUMENTS

2013/0143592 A1* 6/2013 Brisebois .............. H04W 16/18
455/456.1
2013/0294272 A1 11/2013 Xiao et al.
(Continued)

FOREIGN PATENT DOCUMENTS

CN 101076178 A 11/2007
CN 106937296 A 7/2017
(Continued)

OTHER PUBLICATIONS

Author Unknown, "Technical Specification Group Services and System Aspects; General Packet Radio Service (GPRS) enhancements for Evolved Universal Terrestrial Radio Access Network (E-UTRAN) access (Release 16)," Technical Specification 23.401, Version 16.2.0, Mar. 2019, 3GPP Organizational Partners, 418 pages.
(Continued)

*Primary Examiner* — Jae Y Lee
(74) *Attorney, Agent, or Firm* — Withrow & Terranova, PLLC

(57) ABSTRACT

The disclosure refers to a method in a network entity for establishing network cells in a wireless communication system, wherein the network entity provides wireless network coverage to a plurality of network cells. The method comprising the method steps of: identifying a need of establishing network cells, accessing a network cell establishment list, wherein the network cell establishment list defines a number of network cells and an order in which respective network cell is to be established, and establishing network cells in accordance with the order provided by the network cell establishment list. The disclosure also refers to a network entity configured to perform such method.

20 Claims, 9 Drawing Sheets

(56) References Cited

U.S. PATENT DOCUMENTS

2015/0382258 A1    12/2015  Schmidt et al.
2018/0352309 A1*   12/2018  Hopcraft .............. H04L 41/145
2019/0021015 A1     1/2019  Anderson et al.
2019/0141589 A1     5/2019  Wei et al.
2019/0364488 A1*   11/2019  Frenger ................ H04W 76/11

FOREIGN PATENT DOCUMENTS

EP    3029976      *   6/2016   ........... H04W 16/22
EP    3029976 A1       6/2016

OTHER PUBLICATIONS

Author Unknown, "Technical Specification Group Services and System Aspects; System Architecture for the 5G System; Stage 2 (Release 16)," Technical Specification 23.501, Version 16.0.2, Apr. 2019, 3GPP Organizational Partners, 317 pages.
International Search Report and Written Opinion for International Patent Application No. PCT/SE2019/050489, dated Feb. 18, 2020, 11 pages.
Extended European Search Report for European Patent Application No. 19930702.6, dated May 11, 2022, 12 pages.

\* cited by examiner

METHOD IN A NETWORK ENTITY FOR ESTABLISHING NETWORK CELLS AND NETWORK ENTITY CONFIGURED FOR PERFORMING SUCH METHOD

This application is a 35 U.S.C. § 371 national phase filing of International Application No. PCT/SE2019/050489, filed May 27, 2019, the disclosure of which is incorporated herein by reference in its entirety.

TECHNICAL FIELD

The disclosure relates generally to methods and apparatuses for establishing network cells in wireless communication systems. More particular, the disclosure relates to a method for establishing network cells in/for a network entity such as a radio base station.

BACKGROUND

A wireless communication system may include a number of base stations, BSs, that supports wireless communication for a number of radio terminals, also referred to as User Equipment's or User Entities, UEs. When active, a radio terminal of a wireless communication system always attempts to select a coverage area, referred to as network cell, of a given base station to camp on. The base stations may communicate over the air interface operating on radio frequencies with the radio terminals within range of the base station, i.e. within the network cells established of the base station. A base station may transmit at different frequencies in different network cells. Conventionally, the base station and network cell a radio terminal selects to camp on may be based on e.g. measuring the strength of a received radio signal either at the radio terminal or at the base station. The radio terminal can then select to connect to the base station to which it is most advantageous to connect in regard to e.g. the radio link quality, e.g. the base station that provides the strongest radio signal. A UE may be subjected to handover from one network cell to another, whereby the UE terminates the connection to the base station of one network cell and establishes connection to the base station serving the new network cell. One reason may for instance be that more efficient utilization of capacity is sought after, and another may be that the radio terminal is moving away from an area covered by one network cell—the source cell—and is entering an area covered by another network cell—a target cell—which therefore provides better radio conditions for the radio terminal. A radio terminal may communicate with a base station either via uplink, also referred to as forward link, which refers to communication directed from the base station to the radio terminal, or via downlink, also referred to as reverse link, which refers to communication directed from the radio terminal to the base station. Uplink and downlink communication may be performed simultaneously. In addition to communication between radio terminals via base stations the wireless communication system may also provide wireless communication to external data networks, such as e.g. the internet. Wireless communication system may also be referred to as communication network, radio communication system, wireless or radio network, cellular communications network, cellular radio system or cellular network.

Development within wireless communication technology is, and has been for a long time, rushing forward. The use of wireless communication systems continues to grow rapidly, and new wireless technologies and standards are constantly emerging. Just to mention a few of the currently existing communication systems; the Universal Mobile Telecommunications System, UMTS, which was the third generation, 3G, mobile communication system, evolved from the Global System for Mobile Communications, GSM, and was intended to provide improved mobile communication services based on Wideband Code Division Multiple Access, WCDMA, access technology. A key part of GSM is the GSM EDGE Radio Access Network, GERAN. The standards e.g. for GERAN was maintained by the 3rd Generation Partnership Project, 3GPP. The UMTS Terrestrial Radio Access Network, UTRAN is essentially a radio access network using wideband code division multiple access. The base stations of the third generation of mobile communication systems are generally referred to as NodeBs or NBs.

The fourth generation, 4G, of mobile communication systems is generally referred to as Long Term Evolution, LTE. The 3rd Generation Partnership Project for Long Term Evolution, 3GPP LTE, is responsible to evolve the UTRAN into what often is referred to as Evolved UTRAN, E-UTRAN. In LTE the E-UTRAN connects the UEs to a core network, generally referred to as Evolved Packet Core, EPC. Together with the E-UTRAN the EPC forms the Evolved Packet System, EPS. The base stations of the fourth generation of mobile communication systems are generally referred to as evolved NodeBs, eNodeBs or eNBs. The 3GPP LTE radio access standards have been written in order to support high bitrates and low latency both for uplink and downlink traffic.

Currently 3GPP is working on standardization relating to the fifth generation, 5G, of mobile communication systems, which also is referred to as New Radio, NR. In the 5G work in 3GPP a split between Mobility Management, MM, and Session Management, SM, has been defined compared to in EPC where MME, Mobility Management Entity, supports both MM, Mobility Management, and some SM, Session Management, functionality. NR 5G is also defined and developed by 3GPP groups. The Access and Mobility Function, AMF, supports MM functionality and the Session Management Function, SMF, supports SM functionality. The AMF, Application Mobility Function, selects the SMF. Different SMFs may be selected for different PDU, Packet Data Unit, sessions of a UE. The base stations of the fifth generation of mobile communication systems are generally referred to as next generation NodeBs, gNodeBs or gNBs.

Thus, depending on the network communication technology and terminology used, a base station, BS, may be referred to as e.g. radio base station, RBS, base transceiver station, BTS, NB, NodeB, evolved NodeB, eNodeB, eNB, next generation NodeB, gNodeB or gNB, and the term base station or BS is used in this description to denote any of these. A more general denomination also used herein is network node or network entity.

A UE, previously referred to as radio terminal, and which for instance may also be referred to as mobile terminal, wireless terminal or mobile station, may e.g. be a cellular phone, a laptop computer, a wireless communication device or a wireless modem, and may be capable to communicate wirelessly in any of the above described communication systems. As previously mentioned, a wireless communication system may cover a geographical area which generally is divided into particular geographical areas referred to as network cells, cell areas or simply cells. Each network cell area is served by a base station. Depending on the type wireless communication system the base station may be any one of the above disclosed exemplary embodiments of base stations.

When a base station, i.e. what herein generally is referred to as network entity, establishes a network cell what is considered is that a network cell is set-up whereby a radio terminal present within that network cell may operatively connect to that base station. Each base station may serve one or several network cells, and furthermore, each base station may support one or several communication technologies and be directly connected to one or more core networks. Herein, "connected" is generally considered as being synonymous with being "operatively connected".

E.g. for an LTE connection network, a network cell establishment may e.g. be initiated by that an eNodeB establishes a so-called S1 link connection with an Mobility Management Entity, MME. Once the S1 link is established, the eNodeB starts broadcasting Master Information Block, MIB, and System Information Block, SIB, information. The UEs in the established network cell receive the MIB and SIB information and initiate connection to the wireless communication system by means of an Radio Resource Control, RRC, connection. Similar processes are used for establishing network cells for other wireless communication systems. E.g. for NR there are generally two different types of SIBs, one being periodically transmitted, and one being transmitted on request from a UE.

In addition to providing coverage, the plurality of network cells enables that different network cells can be used to provide different services. Such services may e.g. be handling of emergency calls, by emergency call network cells, provide connectivity, by access network cells or provide additional capacity, by capacity network cells.

Under certain circumstances, such as at reboot of a base station, at power outages or at maintenance service of a base station, the base station needs to be restarted whereby re-establishment of network cells is required. Currently there is a trend to host more and more network cells on each individual base station.

SUMMARY

An object of the disclosure is to provide improved methods for establishing network cells at initiation, restart etc. of base stations, herein generally referred to as network entities. Yet an object of the disclosure is to provide network entities adapted to perform improved methods for establishing network cells.

When restarting a network entity, such as e.g. base stations like an NodeB, eNodeB or gNodeB, the wireless communication system temporarily becomes unavailable in the geographical area covered by the network entity, whereby connection to the network cells within that area are lost. Currently, when the network entity is re-started the network entity re-establish the network cells in an arbitrary order, not taking into consideration what a particular network cell is used for. Network cells may e.g. be used for handling emergency calls, may be used for providing general connectivity or may be used for increasing network capacity if required. Network cells may be configured for significantly different purposes, thus be of significantly different importance for the critical functionalities of the wireless communication system.

One exemplary problem with the current solution is that the time until the wireless communication system is available for a particular network cell after restarting a network entity is not deterministic, i.e. cannot be easily predicted. During re-establishment of network cells, both hardware, HW, and software, SW, needs to be initialized for each network cell. HW initialization needs to be done for one network cell at a time to so the benefit of trying to re-establish a plurality of network cells in parallel is none or small. Another problem is that the time before network cells are established may be unnecessary long, especially for critical functionalities such as e.g. for network cells enabling emergency call handling. Further, there is also a trend to host more and more network cells on each base station, i.e. network entity, making this an even bigger problem. One network architecture hosting a relatively large number of network cells on each network entity is C-RAN. In simple terms, C-RAN is a centralized, cloud computing-based architecture for radio access networks that supports 2G, 3G, 4G, 5G and potential future wireless communication technologies.

According to one aspect of the disclosure, an object of the disclosure is achieved by a method in a network entity for establishing network cells in a wireless communication system, wherein the network entity provides wireless network coverage to a plurality of network cells. The method comprising method steps of:
  identifying a need of establishing network cells,
  accessing a network cell establishment list, wherein the network cell establishment list defines a number of network cells and an order in which respective network cell is to be established, and
  establishing network cells in accordance to the order provided by the network cell establishment list.

The method provides the exemplary advantage that the order in which network cells is established is known beforehand whereby it is possible to know which network cells that will be accessible first at initiation or restart of a network entity. Also, it enables that the time until a specific network cell is accessible can be predicted.

According to another aspect, an object is achieved by a method in a network entity wherein the method step of:
  establishing network cells, further comprises the method step of:
  broadcasting information blocks within respective network cell, enabling a User Equipment, UE, of that network cell to establish a wireless connection to the network entity.

Depending on which wireless network communication technology and terminology that is concerned different broadcasted information blocks are transmitted. E.g. an eNodeB of an LTE-bases communication system establishes network relations by transmitting Master Information Block, MIB, and SIB, System Information Block, periodically, whereas a gNodeB of an 5G NR communication system broadcasts SIB both periodically and on request, in addition to broadcasting MIB periodically. Broadcasting information over a network cell, which herein thus generally is referred to as establishing network cells, enables a UE capable of receiving and processing the broadcasted information to establish connection, i.e. become operatively connected, to the broadcasting base station.

According to another aspect of the disclosure, an object of the disclosure is achieved by a method in a network entity wherein the network cell establishment list defines at least one of; number of network cells, type of respective network cell and an order in which respective network cell is to be established. Defining type of respective network cell and/or an order in which respective network cell is to be established, preferably together with the number of relevant network cells, not only provides the exemplary advantage of that the most highly prioritized network cells may be established first, but also the exemplary advantage of enabling predictability of when in time a particular network cell may be established and ready for operation.

According to yet an aspect of the disclosure, an object is achieved by a method in a network entity wherein the type of respective network cell is associated with a priority, e.g. a priority value, defining the order in which the network entity is to establish respective network cell. As will be discussed more in detail later on, associating respective network cell with a priority, e.g. a priority value, has the advantage that a priority lists may be created.

There are various ways in which a network cell establishment list can be obtained, of which two alternatives will be discussed more in detail below. According to a first aspect of the disclosure the network cell establishment list is obtained by being created in the network entity, e.g. by a processing circuitry of the network entity. According to a second aspect of the disclosure the network cell establishment list is obtained by being provided by a network operator.

According to an exemplary embodiment of the first aspect of the disclosure, an object is achieved by a method in a network entity wherein subsequently to performing the method step of:
  identifying a need of establishing network cells, the method further comprises the method step of:
  creating a network cell establishment list, before the method step of:
  accessing a network cell establishment list, is performed.

According another exemplary embodiment of the first aspect of the disclosure, an object is achieved by a method in a network entity wherein the method step of:
  creating a network cell establishment list, is performed based on the level of the transmission output power used by the network entity, and/or bandwidth used by the network entity, when transmitting in respective network cell.

E.g. at installation or set-up of the network entity, i.e. base station, the initial configuration of the network entity provides the network entity with a number of configuration parameters. Level of transmission output power and bandwidth used by the network entity when transmitting in respective network cell may be two of such configuration parameters. The values are generally set by the network operator. The configuration parameters, including level of transmission output power and bandwidth used by the network entity when transmitting in respective network cell, may be temporarily or permanently updated e.g. when new network entities are added to the network or when there is a temporary need of additional output power and/or bandwidth, such as e.g. at a concerts or sport events.

The network cell establishment list may be, but is not limited to be, a priority list, i.e. a list in which network cells are arranged according to at least one of a plurality of potential reasons why one cell is considered to be more important than another network cell. According to one exemplary embodiment of the first aspect an object is achieved by a method in a network entity, wherein the network cells are prioritized in accordance to their respective level of transmission output power, wherein higher level of output power is associated with a higher priority and lower level of output power is associated with a lower priority of respective network cell, and wherein the order in which respective network cell is to be established is created according to decreasing priority of present network cells.

It is also possible that the network entity has been provided with a priority, or priority value, of respective present, or present and potential future, network cell, and that the network cell establishment list is created based on such information. The network entity may have been provided by the priority, or priority value, of respective network cell at set-up or such information may be sent to the network entity, e.g. by the network operator, at predetermined times. Thus, according to yet one exemplary embodiment of the first aspect an object is achieved by a method in a network entity wherein the method step of:
  creating a network cell establishment list,
is performed at least partially based on information derived from the network entity, and wherein the network entity, before performing said method step, i.e. before the network cell establishment list is created, has been provided with a respective priority of a plurality of network cells.

According to an exemplary embodiment of the second aspect of the disclosure, an object is achieved by a method in a network entity wherein before the method step of:
  accessing a network cell establishment list, is performed,
    the method comprises the method step of:
  receiving a network cell establishment list.

According to one exemplary embodiment of the second aspect of the disclosure the network cell establishment list is provided to the network entity by means of transmission by a network operator, such as e.g. by transmission from an Operation Support System, OSS, or an Ericsson Network Management, ENM, system of the network operator. The network entity may be provided with network cell establishment list, e.g. at start-up of the network entity or at reconfiguration of the wireless communication system According to yet one exemplary embodiment the network cell establishment list is based on information derived from a network cell planning of a network operator.

As previously mentioned there may be many ways in which network cells may be classified, clustered and grouped together. One aspect of the disclosure refers to a method in a network entity wherein network cells are classified as: emergency call network cells, access network cells and capacity network cells, and wherein emergency call network cells are associated with high priority, access network cells are associated with medium priority and capacity network cells are associated with low priority. This has the exemplary advantage that network cells enabling more important functionalities are higher prioritized.

Depending on in relation to which wireless network communication technology the disclosure is realized, various network entities, i.e. base stations, are concerned. Thus, according to aspects of the disclosure objects of the disclosure are achieved by a method in a network entity wherein the network entity is a radio access network node, and wherein the radio access network node is a node from a list of nodes comprising; a NodeB, an eNodeB or a gNodeB.

As previously mentioned there may be various reasons for why any aspect, or a combination of aspects, of methods disclosed herein is/are performed. According to one exemplary aspect of the disclosure an object is achieved by a method in a network entity, wherein the method is performed at initiation, i.e. start-up, of the network entity, whereinafter there is a need to establish network cells, wherein such need to establish network cells is identified in the method step of:
  identifying a need of establishing network cells.

According to another exemplary aspect of the disclosure an object is achieved by a method in a network entity, wherein the method is performed at restart of the network entity, whereinafter there is a need to re-establish network cells, wherein such need to re-establish network cells is identified in the method step of:

identifying a need of re-establishing network cells.

Aspects of the disclosure also refer to network entities configured to perform any one of, or a combination of, the methods disclosed herein. Thus, one aspect of the disclosure refers to a network entity of a wireless communication system for providing wireless network coverage to a plurality of network cells, the network entity being configured to:
- identify a need of establishing network cells,
- access a network cell establishment list, wherein the network cell establishment list defines a number of network cells and an order in which respective network cell is to be established, and
- establish network cells in accordance to the order provided by the network cell establishment list.

Further aspects of the disclosure refer to network entities configured to perform any one of, or a combination of, the further methods disclosed herein. Network entities configured to perform aspects of methods disclosed herein provide the same advantages as presented in relation to respective method.

Further, one object of the disclosure is achieved by a method in a network entity, wherein the network entity is provided in the wireless communication system as a virtual machine. The virtual machine may in turn comprise a number of virtual components which e.g. may be embodied as software applications.

Yet an object of the disclosure is achieved by a computer program comprising computer-executable instructions, or a computer program product comprising a computer readable medium, the computer readable medium having the computer program stored thereon, wherein the computer-executable instructions enabling a network entity to perform any method, or any combination of methods, disclosed herein when the computer-executable instructions are executed on a processing circuitry included in the network entity.

Exemplary advantages provided by one or several of the aspects of methods in network entities, and network entities as such, of the disclosure presented herein is that it enables that the time critical and/or important network cells are unavailable, e.g. at restart of a network entity, may be minimized. Further, it also enables that the time before a particular type of network cells, any group of network cells or an specific individual network cell is available can be more accurately predicted.

BRIEF DESCRIPTION OF THE FIGURES

The disclosure may best be understood by referring to the following description and accompanying figures that are used to illustrate particular embodiments of the disclosure.

DETAILED DESCRIPTION

In the following description, for purposes of explanation and not limitation, specific details are set forth, such as particular components, elements, techniques, etc. in order to provide a thorough understanding of the exemplifying embodiments. However, it will be apparent to one skilled in the art that the exemplifying embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein. The terms node and entity are e.g. used interchangeably as relating to a network element that is designed for providing a given functionality in a network and/or communication system referred to, and which may be embodied as a single physical unit or a plurality of connected and interacting physical units. Furthermore, a node or entity may be embodied in the form of hardware, software or any suitable combination thereof.

Figure 1:
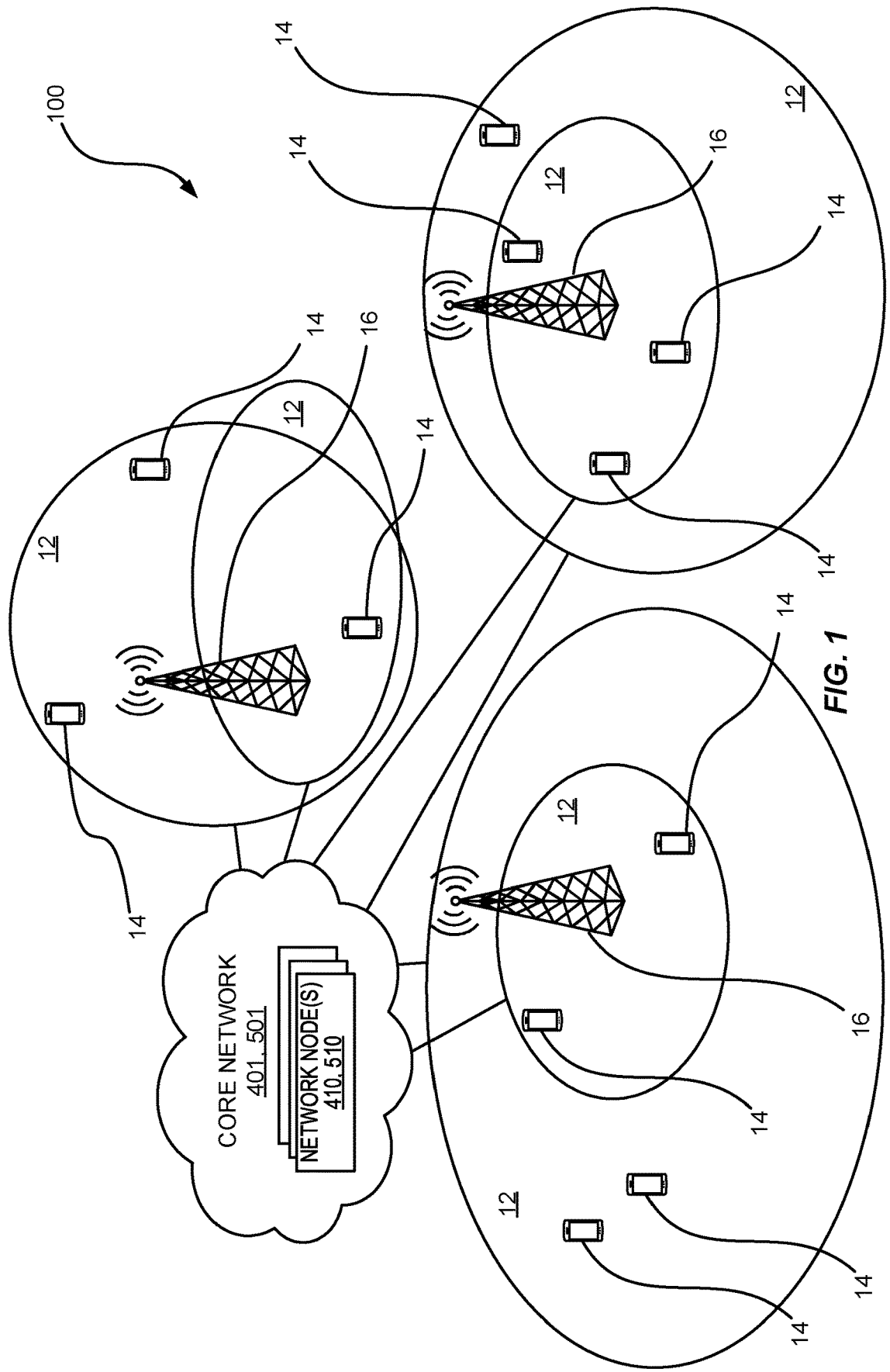
FIG. 1 illustrates an exemplary wireless communication system according to an embodiment of the disclosure.

FIG. 1 illustrates one exemplary embodiment of a wireless communication system 100 in which embodiments of the disclosure may be implemented. The wireless communication system 100 may e.g. be a cellular communications system such as, for example, a 5G New Radio (NR) network, see FIG. 3, or an LTE cellular communications system, see FIG. 2. As illustrated, in this example, the wireless communication system 100 includes a plurality of radio access nodes or base stations 16, herein generally referred to as network entities 16. Such network entities 16 may e.g. be LTE base stations generally referred to as eNodeBs, 5G base stations generally referred to as gNodeBs, or any other type of base station or entity providing corresponding functionality. FIG. 1 further shows a plurality of wireless communication devices 14, herein disclosed as User Equipment's, UEs, 14. The wireless communication system 100 is organized into geographically defined areas referred to as network cells 12, wherein respective network cell 12 is connected to a core network 401, 501 via respective network entity 16. One network entity 16 may provide connectivity to more than one network cell 12. The connectivity provided by a network entity 16 to a network cell 12 is herein generally referred to as that the network entity has established a network cell 12, or has an established (network cell) relation to the network cell 12. The network cells 12 may be provided for different purposes and may be adapted to/configured to various form of communication or service. E.g. the bandwidth used, the frequency used or the output power level used, when providing connectivity, may be different between various types network cells 12. The network entities 16 are capable of communicating with the UEs 14 positioned within respective network cell 12, along with any additional wireless communication devices, or devices provided with communication devices, positioned within respective network cell 12. Such wireless communication device (not shown) may e.g. be a sensor provided for IoT applications and such device provided with communication device (not shown) may e.g. be a connected vehicle. The core network 401, 501 includes a plurality of network node(s) 410, 510. Exemplary network nodes 410, 510 are disclosed in FIG. 2 and FIG. 3.

Figure 2:
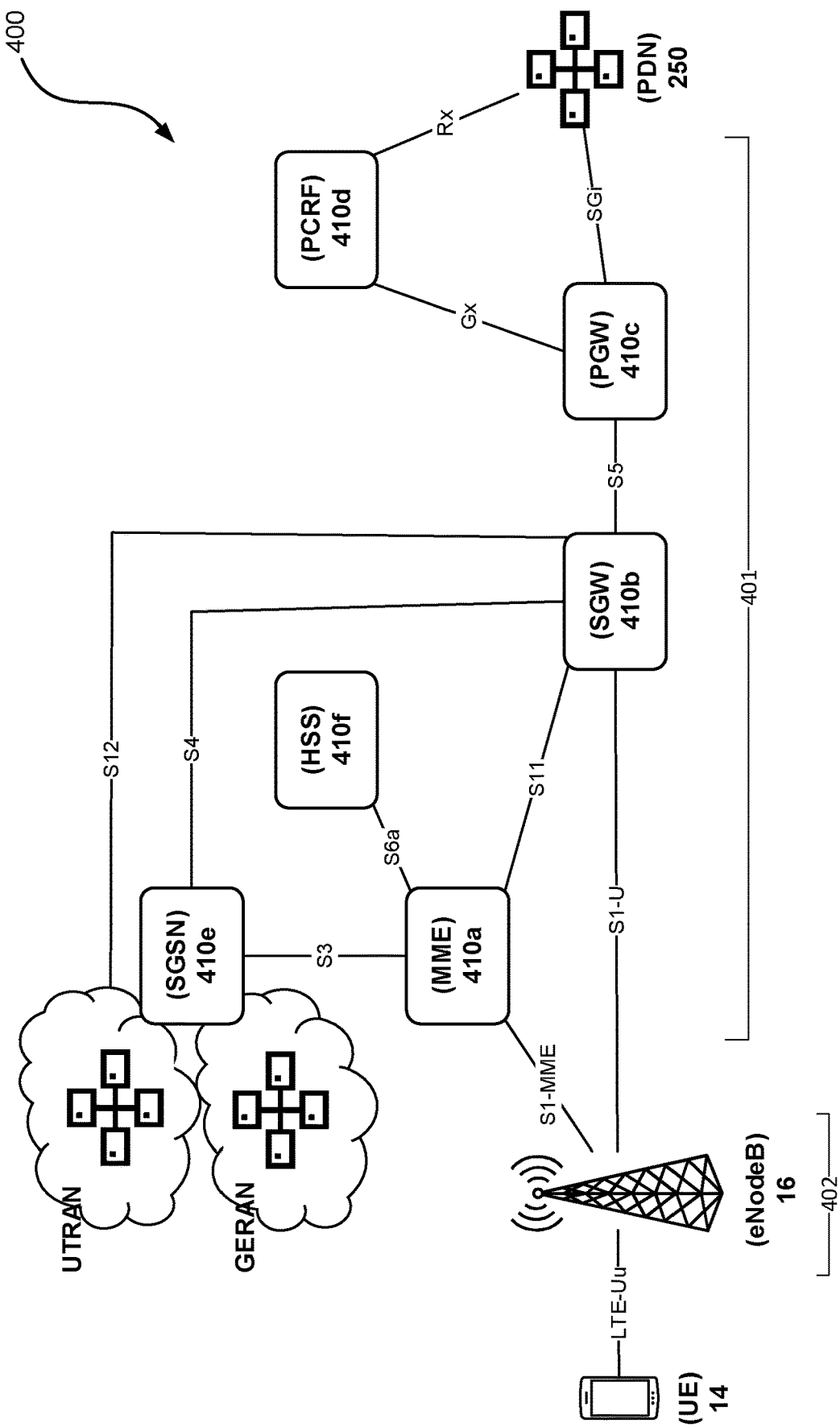
FIG. 2 shows a schematic illustration of a well-known exemplifying LTE architecture.
Figure 3:
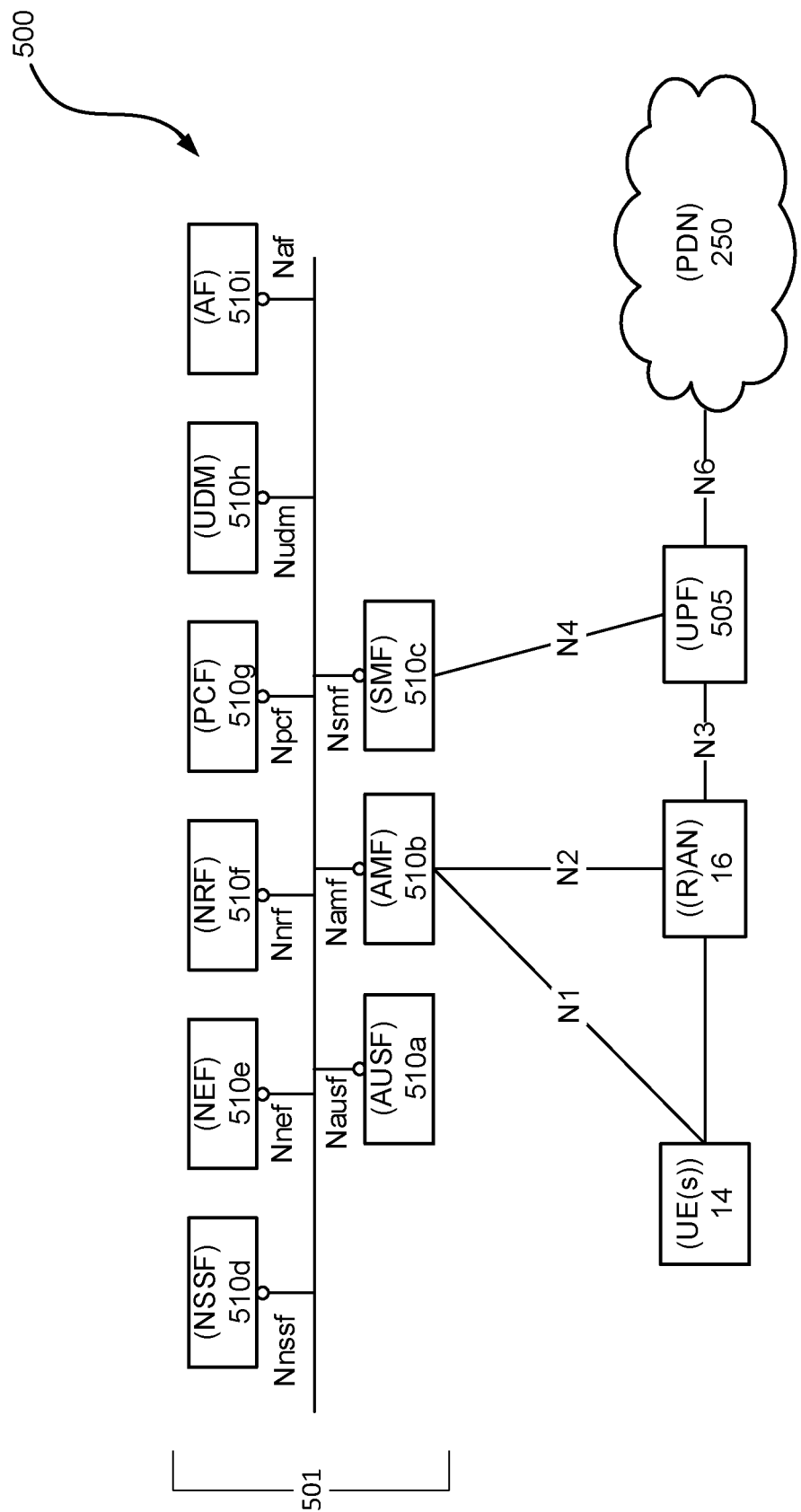
FIG. 3 shows a schematic illustration of a well-known exemplifying 5G NR architecture.

It should be noted that although FIG. 2 and FIG. 3 shows wireless communication systems 400, 500 in the form of a LTE-based system 400 and a 5G NR system 500 respectively, the example embodiments herein may also be utilized and applied in connection with other wireless communication systems comprising network nodes and functions that correspond to the nodes and functions of the communication systems 400, 500 of FIG. 2 and FIG. 3. Such other wireless communication systems may e.g. be based on other 3GPP technologies.

FIG. 2 shows a schematic illustration of a well-known exemplifying wireless communication system 400. The communication system 400 disclosed in FIG. 2 is an LTE-based system. It should be emphasized that the terms "LTE" and "LTE-based" system is used herein to comprise both present and future LTE based systems, such as, for example, advanced LTE systems. As can be seen in FIG. 2, the communication system 400 comprises a network entity 16 in the form of an eNodeB, connected to a Serving Gateway, SGW, 410*b*, in turn connected to a Mobility Management Entity, MME, 410*a* and a PDN Gateway, PGW, 410*c* which in turn is connected to a Policy and Charging Rules Function, PCRF, 410*d*. The SGW 410*b*, the MME 410*a*, the PGW 410*c* and the PCRF 410*d* are examples of network nodes 410 of the core network 401 of the communication system 400 of FIG. 2. An LTE-based system may, in addition to the core network nodes 410 defined herein, comprise a number of additional network nodes or network entities, but for reason of clarity such network nodes are here omitted. The core network 401 in an LTE-based system is generally known as Evolved Packet Core, EPC, and the EPC together with E-UTRAN 402, i.e. the Radio Access Network, RAN, is generally referred to as the Evolved Packet System, EPS, in LTE.

The general functionality of SGW 410*b*, MME 410*a*, PGW 410*c* and PCRF 140*d* nodes are briefly disclosed below.

The SGW 410*b* routes and forwards user data packets via an S1-U interface, while also acting as the mobility anchor for the user plane during inter-eNodeB 16 handovers, i.e. handover from one eNodeB to another eNodeB, and as the anchor for mobility between LTE and other 3GPP technologies. The SGW 410*b* communicates with the MME 410*a* via interface S11 and with PGW 140*c* via interface S5. The SGW 410*b* may also communicate with the UMTS Radio Access Network, UTRAN, and the GSM Edge Radio Access Network, GERAN, via S12 interface. For idle state UEs 14, the SGW 410*b* terminates the Down-Link, DL, data path and triggers paging when DL data arrives for the UE 14. It manages and stores UE 14 contexts, e.g. parameters of the IP bearer service, network internal routing information. It also performs replication of the user traffic in case of lawful interception. The eNodeBs 16 of the communication system 400 forms the radio access network E-UTRAN for LTE communication systems.

The MME 410*a* is a key control-node for the LTE access-network. It is responsible for idle mode UE 14 tracking and paging procedure including retransmissions. It is involved in the bearer activation/deactivation process and is also responsible for choosing the SGW 410*b* for a UE 14 at the initial attach and at time of intra-LTE handover involving Core Network node relocation. It is responsible for authenticating the user, by interacting with a Home Subscriber Server, HSS, 410*f*. The Non-Access Stratum, NAS, signaling terminates at the MME 410*a* and it is also responsible for generation and allocation of temporary identities to UEs 14 via the S1-MMe interface. It checks the authorization of the UE 14 to camp on the service provider's Public Land Mobile Network, PLMN, and enforces UE 14 roaming restrictions. The MME 410*a* is the termination point in the network for ciphering/integrity protection for NAS signaling and handles the security key management. Lawful interception of signaling is also supported by the MME 410*a*. The MME 410*a* also provides the Control Plane Function, CPF, for mobility between LTE and 2G/3G access networks with the S3 interface terminating at the MME 410*a* from a Serving GPRS Support Node, SGSN, 410*e*. The MME 410*a* also terminates the S6*a* interface towards the home HSS 410*f* for roaming UEs 14. Further, there is an interface S10 configured for communication between MMEs 410*a* for MME relocation and MME-to-MME information transfer. An MME 410*a* is an example of a network management entity, ME.

The PGW 410*c* provides connectivity, i.e. enables connection, to the UE 14 to external Packet Data Networks, PDN, 250 by being the point of exit and entry of traffic for the UE 14. A UE 14 may have simultaneous connectivity with more than one PGW 410*c* for accessing multiple PDNs 250. Typically, the PGW 410*c* performs one or more of; policy enforcement, packet filtering for each user, charging support, lawful Interception and packet screening. Another key role of the PGW 410*c* is to act as the anchor for mobility between 3GPP and non-3GPP technologies such as WiMAX and 3GPP2 (CDMA 1X and EvDO). The interface between the PGW 410*c* and the XDN 250 is referred to as the SGi.

The PCRF 410*d* determines policy rules in real-time with respect to the radio terminals of the system. This may e.g. include aggregating information in real-time to and from the core network and operational support systems etc. of the system so as to support the creation of rules and/or automatically making policy decisions for user radio terminals currently active in the system based on such rules or similar. The PCRF 410*d* provides the PGW 410*c* with such rules and/or policies or similar to be used by the acting as a Policy and Charging Enforcement Function, PCEF, via interface Gx. The PCRF 410*d* is further operatively connected to the DPN 250 via the Rx interface.

The SGW 410*b*, MME 410*a*, PGW 410*c* and the PCRF 410*d* are all examples of core network nodes 410, 510, while the eNodeB 16 is an example of a Radio Access Network, RAN, node. The core network nodes 410, 510 communicate with each other by means of GTP messages. GTPv1 and GTPv2 are examples of GTP messages and are used to set up GTP tunnels and to communicate various GTP messages between core network nodes 410, 510 in a core network 400, 500. Generally, a GTP message consists of a header followed by zero or more information elements, IEs.

Figure 4:
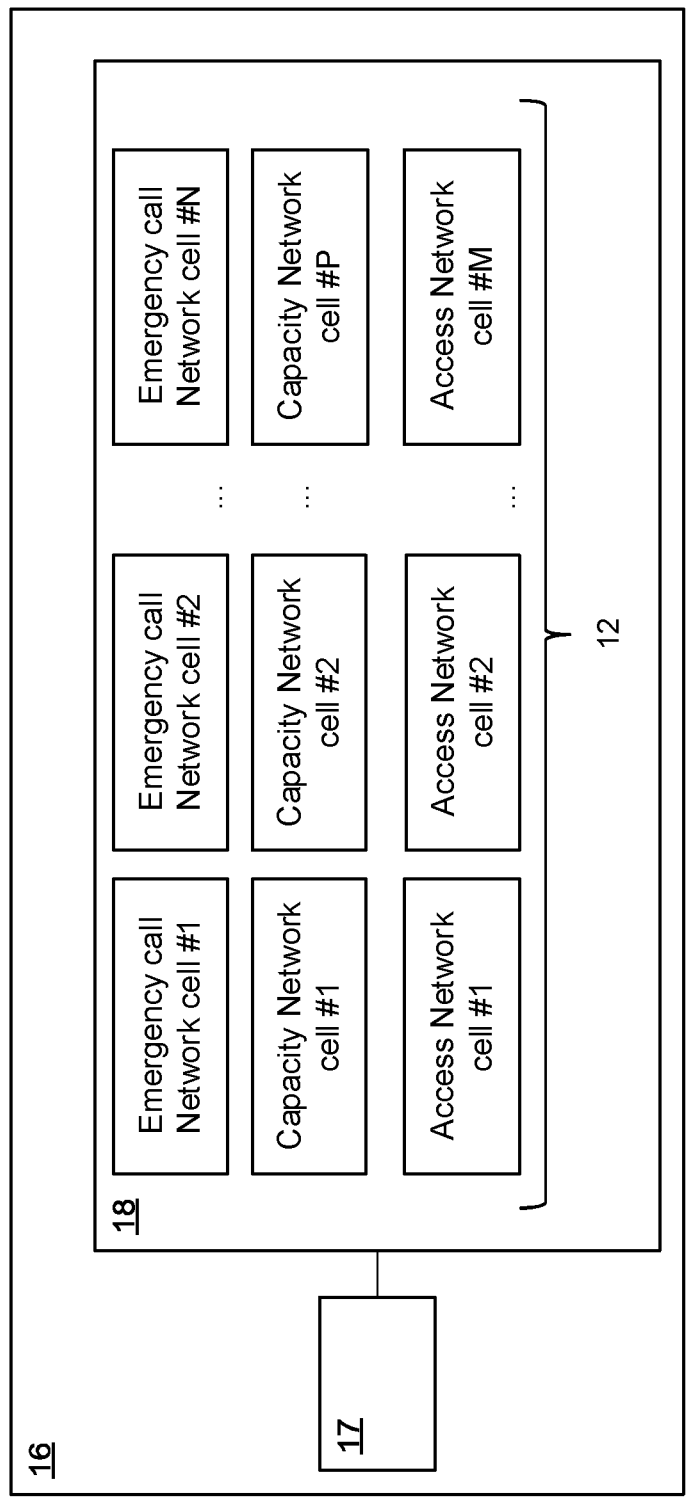
FIG. 4 shows a schematic illustration of a network entity.

The reference architecture shown in the FIG. 2 corresponds essentially to TS 23.401 V16.2.0 (2019-03), FIG. 4.2.1-1, Non-roaming architecture for 3GPP Accesses.

FIG. 3 illustrates some of the functional blocks, also called Network Functions, NFs, for a communication system 500 according to 5G New Radio, NR, network architecture. FIG. 3 discloses e.g. an Authentication Server Function, AUSF, 510*a*, a Unified Data Management, UDM, block, 510*h*, an Access and Mobility Management Function, AMF, 510*b*, a Session Management Function, SMF, 5100*c*, a Policy Control Function, PCF, 510*g*, an Application Function, AF, 510*i*, a UE 14, a Radio Access Network, RAN, which may comprise a number of network entities 16 in form of gNodeBs, a User Plane Function, UPF, 505, and a Data Packet Network, DPN, 250. FIG. 3 illustrates a 5G network architecture using service-based interfaces between the NFs in the control plane. The service-based interfaces are indicated by the letter "N" followed by the name of the NF, e.g. Namf for the service-based interface of the AMF 510*b* and Nsmf for the service-based interface of the SMF 510*c* etc. The service(s) etc. that a NF provides to other authorized NFs is/are exposed to the authorized NFs through the service-based interface of the NF in question. The named interfaces, i.e. N1, N2, N3, N4, N6, are logical connections between the various entities.

In a 5G NR system a split between Mobility Management, MM, and Session Management, SM, has been defined compared to EPC. In LTE the MME of the LTE system supports both MM and some SM functionality. In a 5G NR system the AMF 510*b* supports MM functionality and the SMF 510*c* supports SM functionality. The AMF 510*b* is responsible for selecting SMF 510*c*. Different SMFs 510*c* may be selected for different PDU Sessions of a UE 14, e.g. PDU Sessions to different Data Network Names, DNNs/Access Point Name, APNs, or the same SMF 510*c* may be used.

The reference architecture shown in the FIG. 3 corresponds to TS 23.501 V16.0.2 (2019-04), FIG. 4.2.3-3, 5G System architecture.

FIG. 4 shows a schematic illustration of a network entity 16, wherein the network entity 16 comprises a network cell handler 17 configured for managing a group 18 of unprioritized network cells 12, i.e. established network cells 12 to which the network entity 16 has ongoing, established relations but that not are prioritized in any specific order in relation to one another. The network cell handler 17 may be a physical entity of the network entity 16, such as a module or a device configured that purpose, or a functionality of the network entity 16 implemented e.g. by means of software or program code executed by a processor or processing circuitry.

According to the exemplary disclosure of FIG. 4 the network cells 12 are classified as Emergency call Network cells, Capacity Network cells and Access Network cells, wherein the network cell handler 17 manages 1 to N Emergency call Network cells, 1 to P Capacity cells and 1 to M Access Network cells. The Emergency call Network cells may be network cells 12 used for enabling emergency calls to be made, e.g. by a UE being present within such an Emergency call Network cell, via the network entity 16 of that Emergency call Network cell, the Access Network cells may be network cells 12 used for providing mobile or cellphone coverage over a specific geographical area covered by respective Access Network cell, whereas the Capacity Network cells may be spare network cells 12 which may be used e.g. during temporary high communication system load. The different types of network cells 12 may be associated with different output power, i.e. the output power used by the network entity 16 when transmitting to a specific network cell 12 may be different depending on type of network cell 12. The different types of network cells 12 may also be associated with different bandwidths.

Figure 6:
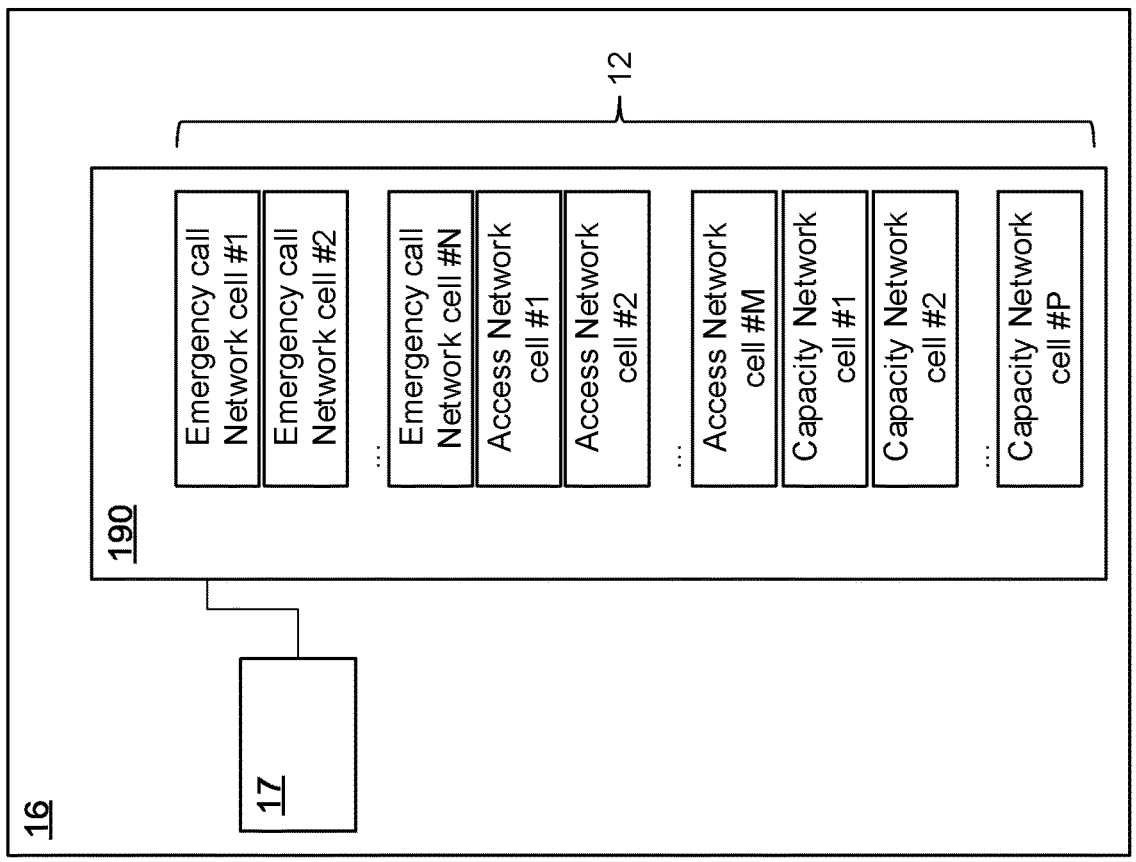
FIG. 6 shows a schematic illustration of an exemplary embodiment according to the disclosure of establishing network cells.
Figure 5:
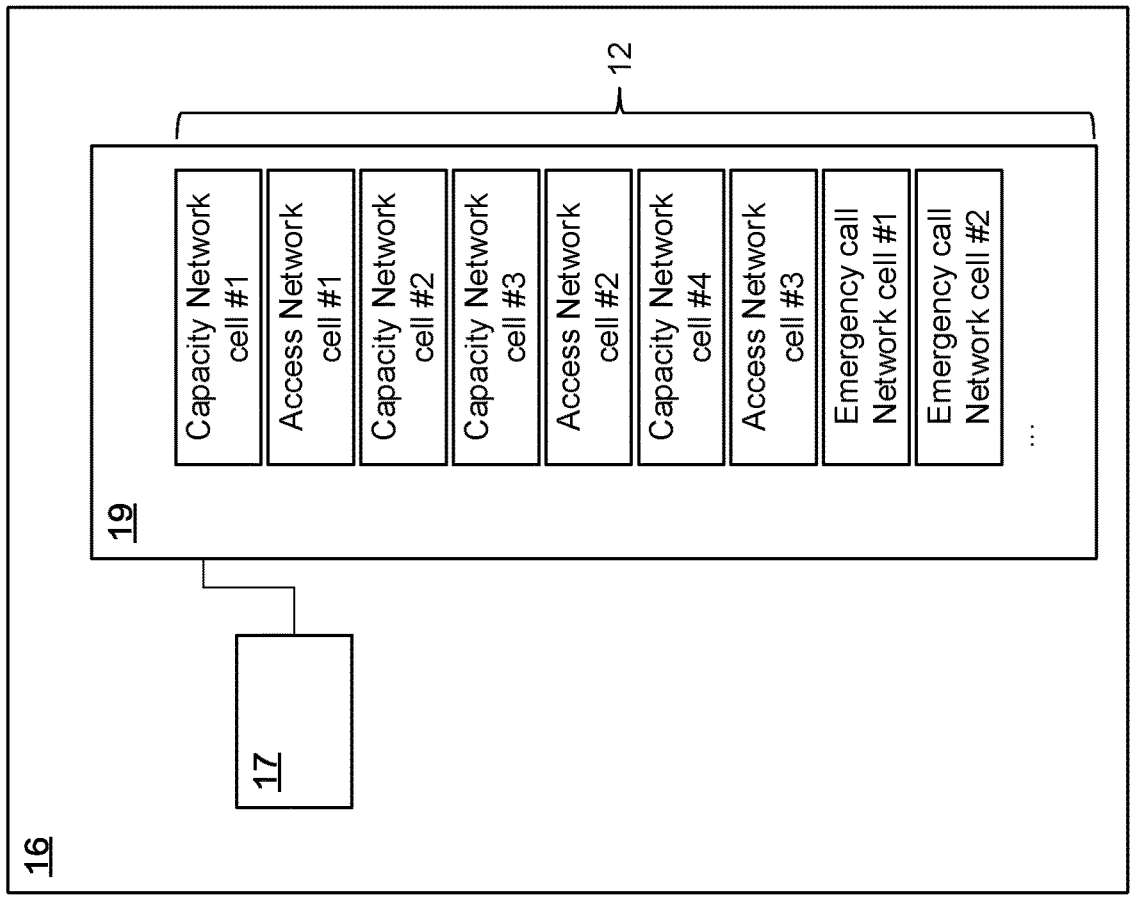
FIG. 5 shows a schematic illustration of a conventional procedure of establishing network cells.

In order to clearly explain the concept of the disclosure, the same exemplary classification of different types of network cells 12 as used in relation to FIG. 4 is used also in relation to FIG. 5 and FIG. 6.

FIG. 5 shows a schematic illustration of network entity 16 re-establishing network cells to a number of unprioritized network cells 12 by using an exemplary, conventional and commonly used method. Today, when a network entity 16 is set-up for the first time or restarted, the network cells 12 are established in arbitrary order without taking into consideration e.g. what type of network cell 12 that is being set-up. FIG. 5 discloses an exemplary arbitrary list 19 of in which order the network cells 12 may be set-up when using conventional methods. In the exemplary example of FIG. 5 critical network cells 12, such as the Emergency call Network cells, are set-up subsequently to not that important network cells 12, such as Capacity Network cells. Thereby, the time until critical functionalities, such as e.g. emergency call handling, is up and running is unnecessary long. Generally, the number of Capacity Network cells is very large in comparison to critical network cells like Emergency call Network cells, and also in comparison to the also more important Access Network cells, making this an even more significant problem. Re-establishing network cells in an arbitrary order further makes it hard to predict when e.g. both Access Network cells, providing connectivity, and Emergency call Network cells, enabling emergency calls to be made, will be re-established. Such uncertainty complicates communication system optimization.

FIG. 6 shows a schematic illustration of an exemplary embodiment of a network entity 16 according to the disclosure re-establishing or establishing network cells 12. According to FIG. 6 the network cell handler 17 is provided with a network cell establishment list 190 according to the disclosure. The network cell establishment list 190 identifies that the first network cells to be established are Emergency call Network cell 1 to N, whereinafter Access Network cell 1 to M are to be established. Finally, Capacity Network cell 1 to P are to be established.

The disclosure has the exemplary advantage that it is possible to minimize the time critical communication system functionalities, exemplified by emergency call handling enabled by Emergency call Network cells in FIG. 6, is unavailable when e.g. restarting a network entity 16. Additionally, by having knowledge of in what order network cells are to be established it is possible to more accurately predict when e.g. connectivity, or other functionality provided by respective network cell 12, is available. This input can be used to optimize communication system performance.

Table 1 shows a non-limiting, fictitious, exemplary calculated time for re-establishing network cells, i.e. what also can be seen as service operation restore time, for emergency call handling, which may be provided by an Emergency call Network cell, and for communication system access handling, which may be provided by a Access Network cell. The predominant part of the time required for establishing or re-establishing network cells is due to various configuration operations, e.g. configuration of the connection between the base band and the radio transmitter. The data required for such configuration operations is generally stored in the network entity, and has generally been provided to the network entity from an Operation Support System, OSS, or an Ericsson Network Management, ENM, system or similar.

In table 1 two exemplary calculations are presented; a first example where the network entity 16 is associated with 24 network cells, this could e.g. be a network entity of a Distributed Radio Access Network, D-RAN, and a second example where the network entity is associated with 960 network cells, this could e.g. be a network entity of a larger Centralized Radio Access Network, C-RAN. It should be noted that 960 network cells, managed by one single network entity, is a very large number of network cells. Today, a more common number is 24, ranging up to about 100, network cells managed by one network entity. In the below presented table 1 it is assumed that the operation of establishing a network cell takes approximately 10 seconds per network cell.

TABLE 1

Service restore times

| Item | Exemplary DRAN Radio Node, 24 cells | Exemplary CRAN Radio Node, 960 cells |
|---|---|---|
| Number of Emergency call Network cells (N) | 3 | 120 |
| Number of Access Network cells (M) | 3 | 120 |
| Number of Capacity Network cells (P) | 18 | 720 |
| Emergency call service restore time worst case without applying method of disclosure = 10 secs*(P + M + N) | 4 minutes | 2 hours 40 minutes |
| Emergency call service restore time applying method of disclosure = 10 secs*N | 0.5 minutes | 20 minutes |
| Network access service restore time (after Emergency call Network cells has been restored) worst case without applying method of disclosure = 10 secs*(P + M) | 3.5 minutes | 2 hours 20 minutes |
| Network access service restore time (after Emergency call Network cells has been restored) with applying method of disclosure = 10*(N + M) | 1 minute | 40 minutes |

For the DRAN example:

By applying an exemplary aspect of the disclosure, the emergency call service restore improvement is (N+M+P)/N, which in the DRAN example is (3+3+18)/3=24/3=8 times faster.

By applying an exemplary aspect of the disclosure, the network access service restore improvement is (P+M)/(N+M), which in the DRAN example is (18+3)/(3+3)=21/6=3,5 times faster.

For the CRAN example:

By applying an exemplary aspect of the disclosure, the emergency call service restore improvement is (N+M+P)/N, which in the DRAN example is (120+120+720)/120=960/120=8 times faster.

By applying an exemplary aspect of the disclosure, the network access service restore improvement is (P+M)/(N+M), which in the DRAN example is (720+120)/(120+120)= 840/240 =3,5 times faster.

As is apparent from table 1 and the fictitious calculations presented above, the results are the same for the DRAN examples and the CRAN examples, but in terms of absolute time, the biggest improvements are for the CRAN examples.

It should be noted that the above disclosed exemplary, fictitious examples are shown to highlight the potential saving in time when restarting network entities according to the disclosure or when applying methods of the disclosure. These examples are in no way to be seen as limiting of the disclosure.

Methods in a network entity for establishing network cells in which a network cell establishment list may be obtained are disclosed below.

As previously emphasized, and as is apparent for a person skilled in the art, the classification of network cells 12 used in relation of FIG. 4, FIG. 5 and FIG. 6 is just one example of the many classifications, clustering etc. possible, and the disclosure is not to be seen as being limited to this exemplary classification.

Figure 7:
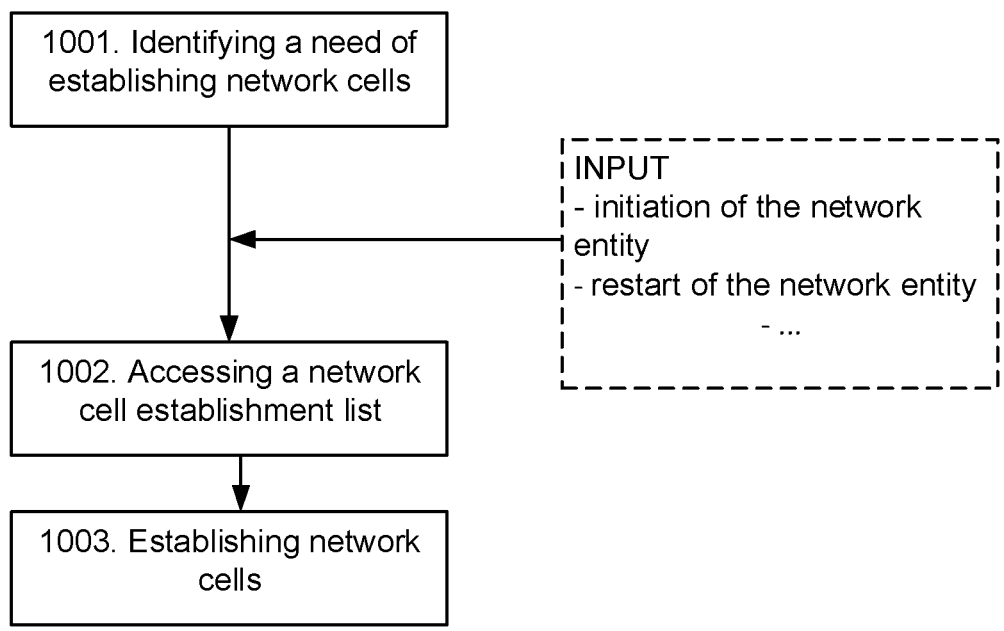
FIG. 7 shows a schematic illustration of a flow diagram of an exemplary embodiment of a method performed by a network entity according to the disclosure.

FIG. 7 shows a schematic illustration of a flow diagram of an exemplary embodiment of a method performed by a network entity according to the disclosure. The method, provided for establishing network cells in a wireless communication system, comprises the following method steps to be performed by a network entity:

identifying a need of establishing network cells 1001,
accessing a network cell establishment list 1002, wherein the network cell establishment list defines a number of network cells and an order in which respective network cell is to be established, and
establishing network cells 1003 in accordance to the order provided by the network cell establishment list.

Figure 8:
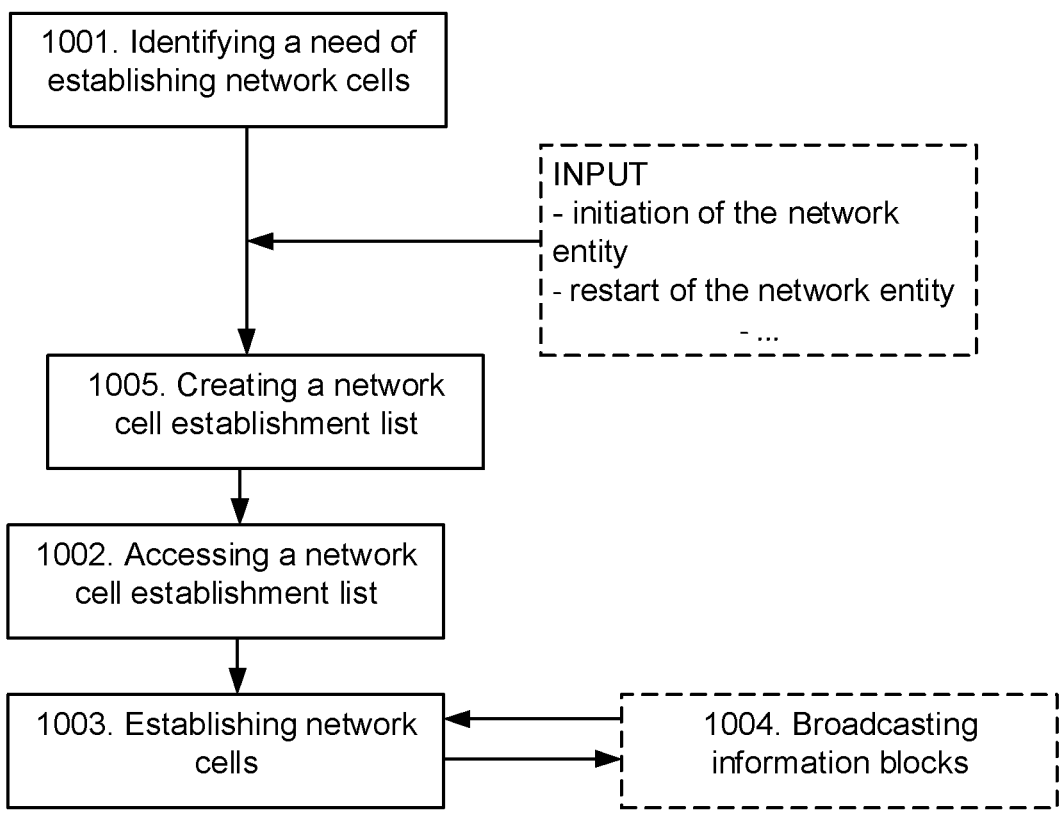
FIG. 8 shows a schematic illustration of a flow diagram of another exemplary embodiment of a method performed by a network entity according to the disclosure.
Figure 9:
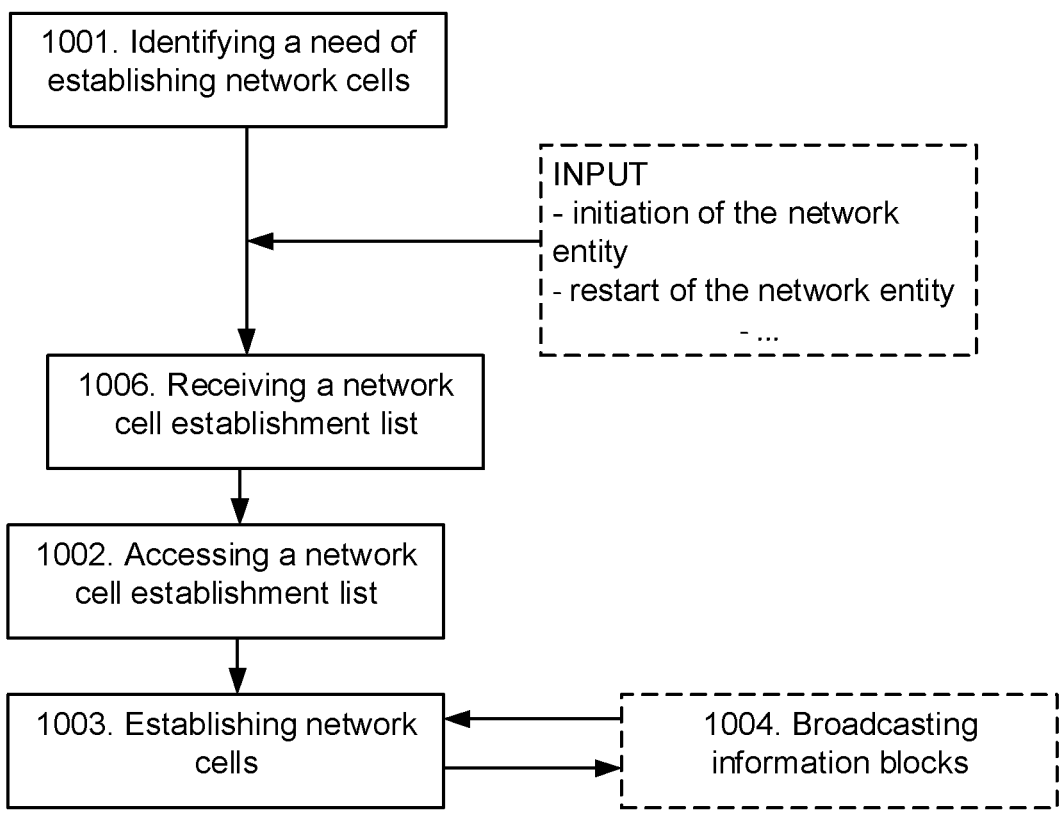
FIG. 9 shows a schematic illustration of a flow diagram of yet another exemplary embodiment of a method performed by a network entity according to the disclosure.

According to exemplary embodiments the method step of:
identifying a need of establishing network cells 1001, may e.g. be positively triggered by: initiation of the network entity, i.e. by that the network entity is started, e.g. by being powered, and set-up the first time, or restart of the network entity. In FIGS. 7, 8 and 9 this is indicated by being illustrated as exemplary INPUT.

FIG. 8 shows a schematic illustration of a flow diagram of another exemplary embodiment of a method performed by a network entity according to the disclosure. The method, provided for establishing network cells in a wireless communication system, comprises the following method steps to be performed by a network entity:

identifying a need of establishing network cells 1001,
creating a network cell establishment list 1005,
accessing a network cell establishment list 1002, wherein the network cell establishment list defines a number of network cells and an order in which respective network cell is to be established, and
establishing network cells 1003 in accordance to the order provided by the network cell establishment list, wherein in the exemplary embodiment of the method illustrated in FIG. 8 the method step of:
establishing network cells 1003, further comprises the optional method step of:
broadcasting information blocks 1004 within respective network cell, enabling a User Equipment, UE, of that network cell to establish a wireless connection to the network entity.

The network cell establishment list may e.g. define; number of network cells, type of respective network cell and an order in which respective network cell is to be established.

According to exemplary embodiments of the disclosure the network cell establishment list may be based on the level of the transmission output power used by the network entity when transmitting in respective network cell. The network cells may be prioritized in accordance to their respective level of transmission output power, wherein higher level of output power is associated with a higher priority and lower level of output power is associated with a lower priority. Consequently, the order in which respective network cell is to be established may be created according to decreasing priority of present network cells. For some exemplary embodiments the network cell establishment list may, potentially in combination with other herein disclosed alternatives, be based on the bandwidth used by the network entity when transmitting in respective network cell. For further exemplary embodiments the network entity may also be provided with a respective priority of a plurality of network cells before performing said method step of:

creating a network cell establishment list 1005, wherein the network cell establishment list, potentially in combination with other herein disclosed alternatives, may be performed at least partially based on information derived from the network entity.

FIG. 9 shows a schematic illustration of a flow diagram of yet another exemplary embodiment of a method performed by a network entity according to the disclosure. The method, provided for establishing network cells in a wireless communication system, comprises the following method steps to be performed by a network entity:

identifying a need of establishing network cells 1001,
receiving a network cell establishment list 1006.
accessing a network cell establishment list 1002, wherein the network cell establishment list defines a number of network cells and an order in which respective network cell is to be established, and
establishing network cells 1003 in accordance to the order provided by the network cell establishment list, wherein in the exemplary embodiment of the method illustrated also in FIG. 9 the method step of:

establishing network cells 1003, further comprises the optional method step of:
broadcasting information blocks 1004 within respective network cell, enabling a User Equipment, UE, of that network cell to establish a wireless connection to the network entity.

In some exemplary embodiments the network cell establishment list may be provided to the network entity by means of wireless transmission by a network operator. Further, the network cell establishment list may be based on information derived from a network cell planning provided by a network operator.

In other exemplary embodiments the network cells may classified as: emergency call network cells, access network cells and capacity network cells, and wherein emergency call network cells are associated with high priority, access network cells are associated with medium priority and capacity network cells are associated with low priority. It should be noted that this is just one exemplary way in which network cells may be classified or grouped and that also other classifications or clustering are feasible.

According to exemplary embodiments of the disclosure a network entity, as referred to when disclosing the exemplary embodiments of methods of FIGS. 7, 8 and 9, may be a radio access network node, wherein the radio access network node may be a node from a list of nodes comprising; a NodeB, an eNodeB or a gNodeB.

It should be noted that the exemplary embodiments of both FIG. 8 and FIG. 9 may be embodied without the optional method step of broadcasting information blocks 1004.

Figure 10:
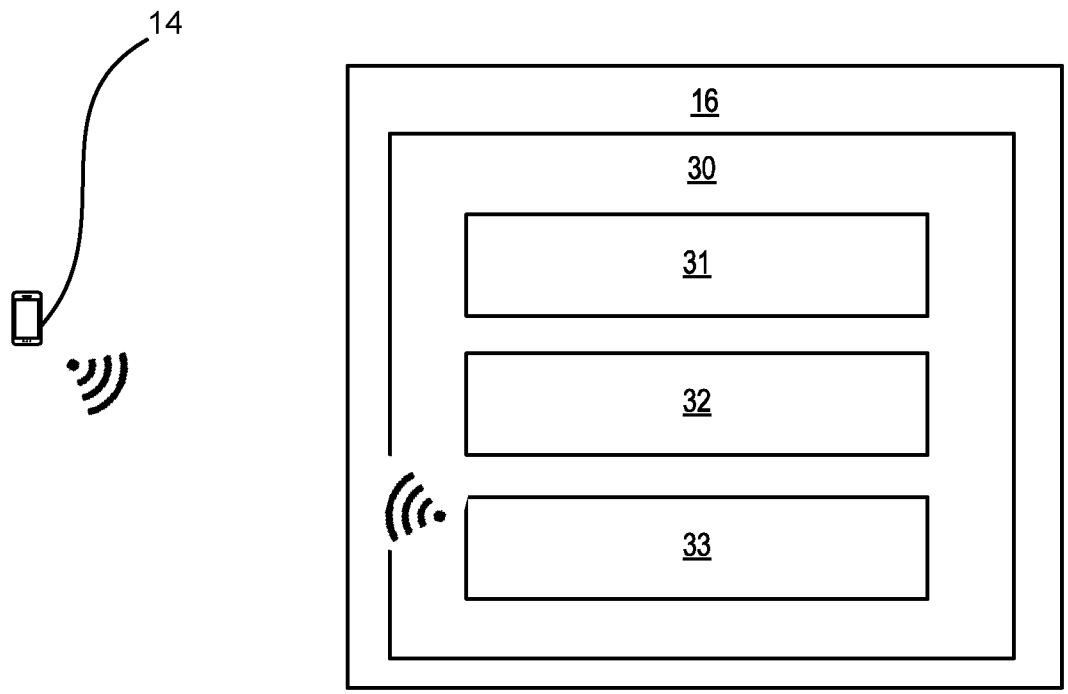
FIG. 10 shows a block diagram schematically illustrating an exemplary embodiment of a network entity according to the disclosure.

FIG. 10 shows a block diagram schematically illustrating an exemplary embodiment of a network entity 16 according to the disclosure.

The network entity 16 comprises a circuitry 30 which is capable of executing the method steps according to any aspect, or any combination of aspects, of methods disclosed herein, e.g. the exemplary embodiments of methods as described in FIG. 7, 8 or 9. The circuitry 30 may comprise one or more processors 31, also referred to as processing circuitry, and a storage 32, also referred to as memory, containing instructions, which when executed cause the one or more processors 31 to perform method steps according to the exemplary embodiments of methods described herein. The circuitry 30 may further comprise a communication interface 33 to communicate with external entities such as e.g. with a UE 14, with other network entities (not shown) in the same wireless communication system and/or with other wireless communication systems (not shown).

The one or more processors 31, which may be embodied as a single physical unit or a plurality of connected and interacting physical units, may include any suitable combination of hardware and software implemented in one or more modules to execute computer-executable instructions and/or process data to perform some or all of the described functions of a network entity 16. In some embodiments, the one or more processors 31 may include e.g. one or more computer devices, one or more Central Processing Units, CPUs, one or more applications, one or more Application Specific Integrated Circuits, ASICs, one or more Field Programmable Gate Arrays, FPGAs, and/or other logic. In certain embodiments, the one or more processors 31 may comprise one or more modules implemented in or by software. The module(s) provide functionality of the network entity 16, which may be implementing e.g. a NodeB, an eNodeB or a gNodeB, in accordance with the embodiments described herein, and/or in accordance with the method steps executed at the network entity 16 shown e.g. in FIG. 7, FIG. 8 and FIG. 9, or according to any other exemplary embodiment described herein. In some embodiments, a computer program including computer-executable instructions which, when executed by at least one processor 31, causes the at least one processor 31 to carry out the functionality of e.g. a NodeB, eNodeB or gNodeB according to any of the embodiments described herein. In some embodiments, a carrier comprising the aforementioned computer program is provided. The carrier may be one of an electronic signal, an optical signal, a radio signal, or a computer readable storage medium, generally referred to simply as storage, such as e.g. a non-transitory computer readable medium. The storage, or memory, is generally operable to store computer-executable instructions, such as of a computer program, of software, of an application including one or more of logic, rules, algorithms, code, tables, etc. and/or other computer-executable instructions capable of being executed by one or more processors 31. Examples of memory include computer memory, e.g. Random Access Memory, RAM, or Read Only Memory, ROM, mass storage media, e.g. a hard disk, removable storage media, e.g. a Compact Disk, CD, or a Digital Video Disk, DVD, and/or or any other volatile or non-volatile, non-transitory computer-readable and/or computer-executable memory devices that store information, data, and/or any type of instructions that may be used by the one or more processors 31 of the network entity 16.

Figure 11:
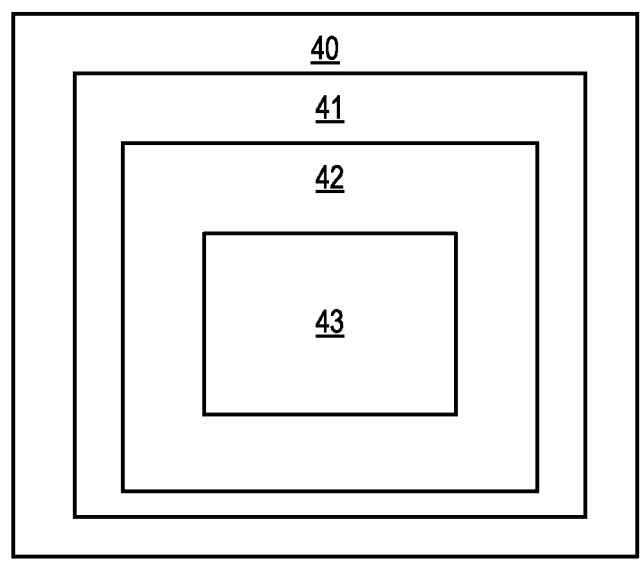
FIG. 11 shows a block diagram schematically visualizing an exemplary embodiment of a computer program product comprising, or consisting of, a computer readable medium having a computer program, comprising computer-executable instructions, stored thereon.

FIG. 11 shows a block diagram schematically visualizing an exemplary embodiment of a computer program product 40 comprising, or consisting of, a computer readable medium 41 having a computer program 42, comprising computer-executable instructions 43, stored thereon. The computer-executable instructions 43 may enable a network entity to perform any of the methods shown in FIG. 7, FIG. 8 or FIG. 9, or any other aspect, or combination of aspects, of methods disclosed herein, when the computer-executable instructions 43 are executed on a processing circuitry or processor included in the network entity.

The exemplary embodiments of network entities described herein may also be embodied as one, or a plurality of interacting, virtual machines, in which at least a portion of the functionality of the network entity is implemented as a virtual component(s).

For reasons of simplicity and space many of the functions, features etc. of the exemplary network entity 16 of FIG. 10, and the exemplary computer program product 40 of FIG. 11, previously described have been left out from FIGS. 10 and 11 respectively.

The embodiments herein are not limited to the above described embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasized that the steps of the methods defined in the appended claims may, without departing from the embodiments herein, be performed in another order than the order in which they appear in the claims, if not contradicting reasonable logic.

LISTING OF EXAMPLE EMBODIMENTS

Below follows a listing of, not limiting, exemplary embodiments of the disclosure.

Embodiment 1. Method in a network entity 16 for establishing network cells in a wireless communication system 100, 400, 500, wherein the network entity 16 provides wireless network coverage to a plurality of network cells 12, the method comprising method steps of:
  identifying a need of establishing network cells 1001,
  accessing a network cell establishment list 1002, wherein the network cell establishment list 190 defines a number of network cells 12 and an order in which respective network cell 12 is to be established, and
  establishing network cells 1003 in accordance to the order provided by the network cell establishment list 190.

Embodiment 2. Method in a network entity 16 according to embodiment 1, wherein the method step of:
  establishing network cells 1003,
further comprises the method step of:
  broadcasting information blocks 1004 within respective network cell 12, enabling a User Equipment, UE, 14 of that network cell 12 to establish a wireless connection to the network entity 16.

Embodiment 3. Method in a network entity 16 according to any one of embodiments 1 or 2, wherein the network cell establishment list defines; number of network cells 12, type of respective network cell 12 and an order in which respective network cell 12 is to be established.

Embodiment 4. Method in a network entity 16 according to any one of embodiments 1 to 3, wherein subsequently to performing the method step of:
  identifying a need of establishing network cells 1001,
the method further comprises the method step of:
  creating a network cell establishment list 1005,
before the method step of:
  accessing a network cell establishment list 1002,
is performed.

Embodiment 5. Method in a network entity 16 according to embodiment 4, wherein the method step of:
  creating a network cell establishment list 1005,
is performed based on the level of the transmission output power used by the network entity 16 when transmitting in respective network cell 12.

Embodiment 6. Method in a network entity 16 according to embodiment 5, wherein the network cells 12 are prioritized in accordance to their respective level of transmission output power, wherein higher level of output power is associated with a higher priority and lower level of output power is associated with a lower priority of respective network cell 12, and wherein the order in which respective network cell 12 is to be established is created according to decreasing priority of present network cells 12.

Embodiment 7. Method in a network entity 16 according to any one of embodiments 4 to 6, wherein the method step of:
  creating a network cell establishment list 1005,
is performed at least partially based on the bandwidth used by the network entity 16 when transmitting in respective network cell 12.

Embodiment 8. Method in a network entity 16 according to any one of embodiments 4 to 7, wherein the method step of:
  creating a network cell establishment list 1005,
is performed at least partially based on information derived from the network entity 16, and wherein the network entity 16, before performing said method step 1005, has been provided with a respective priority of a plurality of network cells 12.

Embodiment 9. Method in a network entity 16 according to any one of embodiments 1 to 3, wherein before the method step of:
  accessing a network cell establishment list 1002,
is performed, the method comprises the method step of:
  receiving a network cell establishment list 1006.

Embodiment 10. Method in a network entity 16 according to embodiment 9, wherein the network cell establishment list 190 is provided to the network entity 16 by means of wireless transmission by a network operator.

Embodiment 11. Method in a network entity 16 according to any one of embodiments 9 or 10, wherein the network cell establishment list 190 is based on information derived from a network cell planning of a network operator.

Embodiment 12. Method in a network entity 16 according to any one of the preceding embodiments, wherein the network cells 12 are classified as: emergency call network cells, access network cells and capacity network cells, and wherein emergency call network cells are associated with high priority, access network cells are associated with medium priority and capacity network cells are associated with low priority.

Embodiment 13. Method in a network entity 16 according to any one of the preceding embodiments, wherein the network entity 16 is a radio access network node, and wherein the radio access network node is a node from a list of nodes comprising; a NodeB, an eNodeB or a gNodeB.

Embodiment 14. Method in a network entity 16 according to any one of the preceding embodiments, wherein the method is performed at initiation of the network entity 16, whereinafter there is a need to establish network cells, wherein such need to establish network cells identified in the method step of:
identifying a need of establishing network cells 1001.

Embodiment 15. Method in a network entity 16 according to any one of the preceding claims, wherein the method is performed at restart of the network entity 16, whereinafter there is a need to re-establish network cells, wherein such need to re-establish network cells is identified in the method step of:
identifying a need of establishing network cells 1001.

Embodiment 16. Network entity 16 of a wireless communication system 100, 400, 500 for providing wireless network coverage to a plurality of network cells 12, the network entity 16 being configured to:
identify a need of establishing network cells,
access a network cell establishment list 190, wherein the network cell establishment list 190 defines a number of network cells 12 and an order in which respective network cell 12 is to be established, and
establish network cells in accordance to the order provided by the network cell establishment list 190.

Embodiment 17. Network entity 16 according to embodiment 16, wherein establish network cells comprises:
broadcast information blocks within respective network cell 12, enabling a User Equipment, UE, 14 of that network cell 12 to establish a wireless connection to the network entity 16.

Embodiment 18. Network entity 16 according to any one of embodiments 16 or 17, wherein the network cell establishment list 190 defines; a number of network cells 12, a type of respective network cell 12 and an order in which respective network cell 12 is to be established.

Embodiment 19. Network entity 16 according to any one of embodiments 16 to 18, being configured to, after a need of establishing network cells has been identified:
create a network cell establishment list 190, before said network cell establishment list 190 is accessed.

Embodiment 20. Network entity 16 according to any one of embodiments 16 to 19, wherein the network cell establishment list 190 is based on the level of the transmission output power used by the network entity 16 when transmitting in respective network cell 12.

Embodiment 21. Network entity 16 according to any one of embodiments 16 to 20, wherein the network cells 12 are prioritized in accordance to their respective level of transmission output power, wherein higher level of output power is associated with a higher priority and lower level of output power is associated with a lower priority of respective network cell 12, and wherein the cell establishment list 190 is created according to decreasing priority of present network cells 12.

Embodiment 22. Network entity 16 according to any one of embodiments 19 to 21, wherein the network cell establishment list 190 is at least partially based on information derived from the network entity 16, and wherein the network entity 16, before creating a network cell establishment list 190, has been provided with a respective priority of a plurality of network cells 12.

Embodiment 23. Network entity 16 according to any one of embodiments 19 to 22, wherein the network cell establishment list 190 is at least partially based on the bandwidth used by the network entity 16 when transmitting in respective network cell 12.

Embodiment 24. Network entity 16 according to any one of embodiments 19 to 23, wherein before the network cell establishment list 190 is accessed the network entity 16 is configured to:
receive a network cell establishment list 190.

Embodiment 25. Network entity 16 according to embodiment 24, wherein the network cell establishment list 190 is provided to the network entity 16 by means of wireless transmission by a network operator.

Embodiment 26. Network entity 16 according to any one of embodiments 24 or 25, wherein the network cell establishment list 190 is based on information derived from a network cell planning of a network operator.

Embodiment 27. Network entity 16 according to any one of embodiments 16 to 26, wherein network cells 12 are classified as: emergency call network cells, access network cells and capacity network cells, and wherein emergency call network cells are associated with high priority, access network cells are associated with medium priority and capacity network cells are associated with low priority.

Embodiment 28. Network entity 16 according to any one of embodiments 16 to 27, wherein the network entity 16 is a radio access network node, and wherein the radio access network node is a node from a list of nodes comprising; a NodeB, an eNodeB or a gNodeB.

Embodiment 29. Network entity 16 according to any one of embodiments 16 to 28, wherein the network entity 16 is configured to identify a need of establishing network cells 12 at:
initiation of the network entity 16.

Embodiment 30. Network entity 16 according to any one of embodiments 16 to 29, wherein the network entity 16 is configured to identify a need of re-establishing network cells 12 at:
restart of the network entity 16.

Embodiment 31. Method in a network entity 16 according to any one of embodiments 16 to 30, wherein network entity 16 is provided in the wireless communication system 100, 400, 500 as a virtual machine.

Embodiment 32. Computer program 42 comprising computer-executable instructions 43, or a computer program product 40 comprising a computer readable medium 41, the computer readable medium 41 having the computer program 42 stored thereon, wherein the computer-executable instructions 43 enabling a network entity 16 to perform the method steps of any one of claims 1 to 15 when the computer-executable instructions 43 are executed on a processor included in the network entity.

The invention claimed is:

1. A method performed by a network entity for establishing network cells in a wireless communication system, wherein the network entity provides wireless network coverage to a plurality of network cells, the method comprising method steps of:
   identifying a need of establishing network cells,
   accessing a network cell establishment list, wherein the network cell establishment list defines a number of network cells and an order in which the network cells are to be established, wherein the order in which the network cells are to be established is at least partially based on whether a network cell is classified as an access network cell, a capacity network cell, or as an emergency call network cell, and
   establishing the network cells in accordance with the order provided by the network cell establishment list.

2. The method in a network entity according to claim 1, wherein the method step of:
   establishing network cells,
further comprises the method step of:
   broadcasting information blocks within respective network cell, enabling a User Equipment, UE, of that network cell to establish a wireless connection to the network entity.

3. The method in a network entity according to claim 1, wherein the network cell establishment list defines; number of network cells, type of respective network cell and an order in which respective network cell is to be established.

4. The method in a network entity according to claim 1, wherein subsequently to performing the method step of:
   identifying a need of establishing network cells,
the method further comprises the method step of:
   creating a network cell establishment list,
before the method step of:
   accessing a network cell establishment list,
is performed.

5. The method in a network entity according to claim 4, wherein the method step of:
   creating a network cell establishment list,
is performed based on the level of the transmission output power used by the network entity when transmitting in respective network cell.

6. The method in a network entity according to claim 5, wherein the network cells are prioritized in accordance with their respective level of transmission output power, wherein higher level of output power is associated with a higher priority and lower level of output power is associated with a lower priority of respective network cell, and wherein the order in which respective network cell is to be established is created according to decreasing priority of present network cells.

7. The method in a network entity according to claim 4, wherein the method step of:
   creating a network cell establishment list,
is performed at least partially based on the bandwidth used by the network entity when transmitting in respective network cell, or
is performed at least partially based on information derived from the network entity, and wherein the network entity, before performing said method step, has been provided with a respective priority of a plurality of network cells.

8. The method in a network entity according to claim 1, wherein before the method step of:
   accessing a network cell establishment list,
is performed, the method comprises the method step of:
   receiving a network cell establishment list.

9. The method in a network entity according to claim 1, wherein the network cells are classified as: emergency call network cells, access network cells and capacity network cells, and wherein emergency call network cells are associated with high priority, access network cells are associated with medium priority and capacity network cells are associated with low priority.

10. The method in a network entity according to claim 1, wherein the method is performed at initiation or restart of the network entity, whereinafter there is a need to establish network cells, wherein such need to establish network cells is identified in the method step of:
    identifying a need of establishing network cells.

11. A network entity of a wireless communication system for providing wireless network coverage to a plurality of network cells, the network entity comprising processing circuitry being configured to cause the network entity to:
    identify a need of establishing network cells,
    access a network cell establishment list, wherein the network cell establishment list defines a number of network cells and an order in which the network cells are to be established, wherein the order in which the network cells are to be established is at least partially based on whether a network cell is classified as an access network cell, a capacity network cell, or as an emergency call network cell, and
    establish the network cells in accordance with the order provided by the network cell establishment list.

12. The network entity according to claim 11, characterized in that establish network cells comprises:
    broadcast information blocks within respective network cell, enabling a User Equipment, UE, of that network cell to establish a wireless connection to the network entity.

13. The network entity according to claim 11, characterized in that the network cell establishment list defines; a number of network cells, a type of respective network cell and an order in which respective network cell is to be established.

14. The network entity according to claim 11, characterized in that the network cell establishment list is based on the level of the transmission output power used by the network entity when transmitting in respective network cell.

15. The network entity according to claim 11, characterized in that the network cells are prioritized in accordance with their respective level of transmission output power, wherein higher level of output power is associated with a higher priority and lower level of output power is associated with a lower priority of respective network cell, and wherein the cell establishment list is created according to decreasing priority of present network cells.

16. The network entity according to claim 11, characterized in that the network cell establishment list is at least partially based on information derived from the network entity, and wherein the network entity before creating a network cell establishment list has been provided with a respective priority of a plurality of network cells.

17. The network entity according to claim 11, characterized in that the network cell establishment list is at least partially based on the bandwidth used by the network entity when transmitting in respective network cell.

18. The network entity according to claim 11, characterized in that the network cells are classified as: emergency call network cells, access network cells and capacity network cells, and wherein emergency call network cells are associated with high priority, access network cells are associated with medium priority and capacity network cells are associated with low priority.

19. The network entity according to claim 11, characterized in that the network entity is configured to identify a need of establishing network cells at:
  initiation or restart of the network entity.

20. A non-transitory computer readable medium comprising computer-executable instructions, wherein the computer-executable instructions enable a network entity to, when the computer-executable instructions are executed on a processor included in the network entity:
  identify a need of establishing network cells,
  accessing a network cell establishment list, wherein the network cell establishment list defines a number of network cells and an order in which the network cells are to be established, wherein the order in which the network cells are to be established is at least partially based on whether a network cell is classified as an access network cell, a capacity network cell, or as an emergency call network cell, and
  establishing the network cells in accordance with the order provided by the network cell establishment list.

\* \* \* \* \*